United States Patent [19]

Smith et al.

[11] 4,101,288
[45] Jul. 18, 1978

[54] METHOD AND A SUPPORT ASSEMBLY FOR SUPPORTING AN AIR RING IN A REGENERATOR IN A FLUID CATALYTIC CRACKING UNIT

[75] Inventors: James A. Smith, Houston; John P. MacLean, Stafford; Thomas W. DeBoise, Missouri City, all of Tex.

[73] Assignee: Texaco Inc., New York, N.Y.

[21] Appl. No.: 820,189

[22] Filed: Jul. 29, 1977

[51] Int. Cl.² .................. B01J 8/24; F16M 13/02; B23K 28/00

[52] U.S. Cl. .................. 23/288 B; 23/252 R; 23/284; 23/288 S; 23/291; 29/157 R; 29/428; 165/82; 248/14;17;DIG. 1

[58] Field of Search .................. 23/288 B, 288 S, 291, 23/284, 252 R; 248/DIG. 1, 14, 17; 165/82; 29/157 R, 428

[56] References Cited

U.S. PATENT DOCUMENTS

| | | | |
|---|---|---|---|
| 2,464,356 | 3/1949 | Stearns | 248/DIG. 1 UX |
| 2,554,130 | 5/1951 | Strunk | 165/82 |
| 2,761,639 | 9/1956 | Horn | 248/DIG. 1 |
| 2,904,410 | 9/1959 | Traue | 23/288 S |
| 2,985,516 | 5/1961 | Traue et al. | 23/288 S |
| 3,460,785 | 8/1969 | Abidi | 248/17 |
| 3,482,946 | 12/1969 | Shirk | 23/284 |
| 3,606,979 | 9/1971 | Paine | 248/14 |
| 3,912,460 | 10/1975 | McGann | 23/288 B |
| 3,951,629 | 4/1976 | Kalen | 23/288 S X |
| 3,982,902 | 9/1976 | Lortz | 23/288 B X |

FOREIGN PATENT DOCUMENTS

| | | | |
|---|---|---|---|
| 163,779 | 8/1952 | Australia | 23/288 S |
| 1,130,077 | 1/1957 | France | 23/288 S |

*Primary Examiner*—Barry S. Richman
*Attorney, Agent, or Firm*—Thomas H. Whaley; Carl G. Ries; Theron H. Nichols

[57] ABSTRACT

The method comprises basically (1) fixedly securing, as by welding, an air inlet header between an air ring at a predetermined location point and the bottom of the regenerator for a primary support, (2) connecting other elongated supports under the air ring as secondary supports, (3) pivotally mounting slip rings on parallel pivot pins on opposite ends of each of the secondary supports and inserting them into corresponding pairs of sleeves mounted oppositely on the air ring and regenerator, (4) aligning each support so that its corresponding pivot pin is normal to a line between each pin and the predetermined location point, and (5) welding the slip rings in their respective sleeves with the supports so aligned to provide pivotal movement about the slip ring pins for eliminating any bending stresses due to thermal expansion or contraction when operating in the 1,100° F.–1,400° F. heat range of a regenerator in a fluid catalytic cracking unit. A support assembly assembled by the above or similar method is disclosed.

20 Claims, 3 Drawing Figures

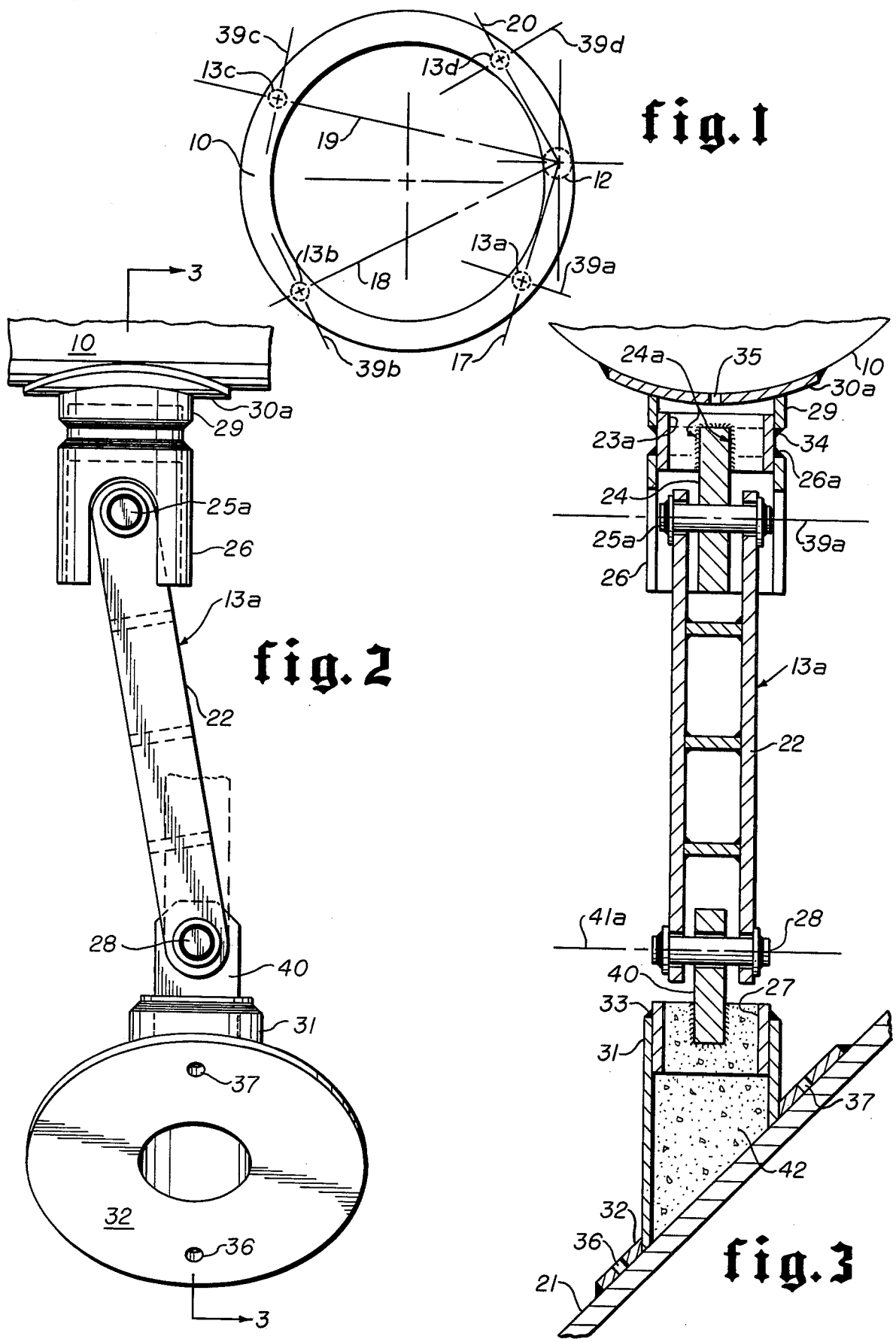

METHOD AND A SUPPORT ASSEMBLY FOR SUPPORTING AN AIR RING IN A REGENERATOR IN A FLUID CATALYTIC CRACKING UNIT

BACKGROUND OF THE INVENTION

In the regenerator of a fluid catalytic cracking unit, there are frequently placed pipe headers fitted with a plurality of nozzles for the purpose of distributing the regeneration air into the fluidized bed of catalyst. These headers frequently but not necessarily are shaped into a ring configuration and supplied by an inlet header entering the vessel from below as illustrated in U.S. Pat. No. 3,912,460. Rings must be supported and since the ring temperature approaches the process temperature (1,100°–1,400° F.) and shell temperatures are low (200°–400° F.) due to vessel shell internal insulation, supports must be able to compensate for a considerable amount of differential thermal expansion between the ring mechanism, inlet header, shell supporting structure, and ring elongated supporting elements.

In another reactor, U.S. Pat. No. 3,482,946, there is much support structure for the rings to expand, warp, and twist out of shape due to any differential thermal expansion.

While the four support structures disclosed in U.S. Pat. Nos. 2,464,356; 2,554,130; 2,761,639; and 3,606,979 attempt to provide flexibility in their respective mountings, none disclose an elongated support element that may be aligned first in position and then welded in position at both ends as it is held in aligned position and yet provide pivotal movement at both ends of the elongated support element. A principal feature of the disclosed support assembly is the utilization of slip rings that make possible easy alignment prior to welding. None of the above disclosures show such slip rings or methods for assembling them. Another feature of the slip ring-weld connection is that with any thermal expansion or contraction of the elongated support element, supported mechanism, and supporting structure due to operating in the high temperature environment causes pivotal movement of the first slip ring about its pivot pin and pivotal movement of the second slip ring about its pivot pin for preventing undue, intolerable, and unacceptable stresses in the fixed connections.

OBJECTS OF THE INVENTION

Accordingly a primary object of this invention is to provide a method for assembling a support assembly including the step of pivotally mounting slip rings on both ends of elongated support elements for supporting a mechanism on a support structure that provides pivotal movement at each end of support elements for elimination of any bending stresses due to thermal expansion or contraction.

Another primary object of this invention is to provide a support assembly for supporting a mechanism on a supporting structure comprising support elements having pivotal slip rings on each end for elimination of any bending stresses due to thermal expansion or contraction.

A further object of this invention is to provide a method for forming a mechanism or support assembly for supporting a mechanism on a supporting structure that is easy to operate, is of simple configuration, is economical to build and assemble, and is of greater efficiency for the elimination of any bending stresses due to thermal expansion or contraction.

Other objects and various advantages of the disclosed method for forming a support assembly and a support assembly made by the method will be apparent from the following detailed description, together with the accompanying drawings, submitted for purposes of illustration only and not intended to define the scope of the invention, reference being made for that purpose to the subjoined claims.

BRIEF DESCRIPTION OF THE DRAWINGS

The drawings diagrammatically illustrated by way of example, not by way of limitation, one form of the invention wherein like reference numerals designate corresponding parts in the several views in which:

FIG. 1 is a plan view of the air ring showing the alignment of the slip ring pivot pins, a principal feature of the invention;

FIG. 2 is a schematic diagrammatic elevational view of a support assembly for supporting an air ring in a regenerator vessel in a field catalytic cracking unit (FCCU); and FIG. 3 is a section at 3—3 on FIG. 1.

DESCRIPTION OF THE PREFERRED METHOD FOR FORMING A SUPPORT ASSEMBLY

The invention disclosed herein, the scope of which being defined in the appended claims is not limited in its application to the details of the method and of the construction and arrangement of parts shown and described, since the invention is capable of other embodiments and of being practiced or assembled in various other ways and by other methods. Also, it is to be understood that the phraseology or terminology employed here is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

Basically, the disclosed method for forming a support assembly for supporting a mechanism, as an air ring on or in a supporting structure as a regenerator in a fluid catalytic cracking unit (FCCU) in a typical temperature operating range of 1,100°–1,400° F., wherein the support assembly comprises a primary element and a plurality of upright elongated secondary support elements, each secondary support element having first and second slip rings and first and second pivot pins comprising the following method steps of, (1) fixedly securing a primary support between the mechanism at a predetermined first location point and the supporting structure, (2) pivotally mounting a first slip ring on a first pivot pin in a first one of the plurality of elongated supports and pivotally mounting a second slip ring on a second pivot pin in the other end of the one elongated support, (3) extending an outer portion of the first slip ring into a first sleeve fixedly secured to the supported mechanism, (4) extending an outer portion of the second slip ring into a second sleeve fixedly secured to the supporting structure, (5) aligning the first pivot pin normal to a line between the first slip ring and the predetermined first location point, (6) fixedly securing the second slip ring in its supporting structure second sleeve with the first slip ring so aligned, and then, (7) fixedly securing the first slip ring to its supported mechanism first sleeve so that with any thermal expansion or contraction of the elongated supports, the supported mechanism, and the supporting structure due to operating in the high temperature environment causes pivotal movement of the first slip ring about its pivot pin and pivotal movement of the second slip ring about its pivot pin for preventing undue, intolerable, and unacceptable stresses in the fixed connections of the two slip rings, the two sleeves, and in portions of the supported mechanism and supporting structure adjacent the fixed connections, and whereby a simple and economical support assembly is formed because orientation and installation of the slip rings are easily and conveniently facilitated.

When forming a support assembly for supporting an air ring in a regenerator in a fluid catalytic cracking unit for operating in the temperature range of 1,100°–1,400° F., the following method steps may be utilized, (1) welding an air inlet header between the air ring at a predetermined location point and the bottom of the regenerator, (2) connecting other elongated supports under the air ring, (3) pivotally mounting in the shop slip rings on pivot pins on opposite ends of each of the other supports, the two pins on each support being formed parallel to each other, (4) inserting the pivotally mounted pair of slip rings of each support into the two corresponding sleeves mounted oppositely on the air ring and regenerator, (5) aligning each support so that its corresponding pivot pin is normal to a line between that pin and the predetermined location point, and (6) welding in the field the slip rings in their respective sleeves with the supports so aligned to provide pivotal movement about the slip ring pins for elimination of any bending stresses due to thermal expansion or contraction.

More details of step three above include the feature illustrated in FIG. 3 particularly of forming the slip ring in the shop. Here, after a link is pivotally mounted on each end of a support beam and each link held centered in a short cylinder of a predetermined diameter for sliding internally of sleeves welded to the respective air ring and regenerator, the link is welded securely inside the short cylinder.

Likewise, in the shop and if so desired, a shroud covering the upper pivot joint is welded to the upper cylinder as illustrated in FIG. 3. Also a lower sleeve is welded to a carbon steel pad which in turn is welded to the regenerator vessel steel shell. The lower cylinder is then filled with insulating refractory consistent with that used on the regenerator shell. The pivot pins on each end are held parallel to each other and so fixedly secured.

Then after taking the supports to the field where the cylinder on each end is inserted in the respective sleeves on the bottom of the air ring and upper surface of the bottom of the regenerator vessel steel shell, the pivot pin of one slip ring, preferably the upper slip ring, is aligned normal to a line from the middle of that pivot pin to the predetermined location point as illustrated in FIG. 1.

Then, with the support held with its slip rings protruding into its respective cylinder and properly aligned therein, the bottom or lower slip ring is field welded in its lower sleeve and the upper slip ring is welded in its upper sleeve.

Each support is aligned in vertical position with the two slip rings in substantially vertical alignment with each other when cold, preferably, so that upon reaching the high operating temperature range, the supported air ring is level and the illustrated supports then assume a tilted position in the direction of the above described line as shown in solid lines in FIG. 2.

Thus the advantages of the disclosed pivotal slip ring over the pivots of U.S. Pat. No. 3,606,979 are:

(1) Installation of the elongated support elements in confined locations is facilitated.

(2) Precise orientation of the pivot pins of the elongated support elements normal to the line between each pin and the predetermined location point is facilitated.

(3) Field welds are minimized thus allowing most fabrication to take place under more favorable shop conditions.

DESCRIPTION OF AN APPARATUS

While various support devices may be formed by the above methods, FIGS. 1-3 illustrate at least one support assembly that may be formed by the methods described above, or may be formed by other methods, as by hand, for example.

FIG. 1, a plan view of the air ring 10, is a schematic disclosure of the alignment feature of the support assembly for the air ring. This support assembly comprises a primary support 12, as the air inlet in this example, and four secondary elongated supports 13a, 13b, 13c, and 13d. Each of the latter supports has a line of travel or pivotal movement 17, 18, 19 and 20, respectively.

FIG. 2, a schematic side view of one of the secondary elongated supports 13a after it has expanded to the tilted solid line position from the cold broken line position.

FIG. 3, a sectional view taken at 3—3 on FIG. 2, discloses one secondary support 13a of the total support assembly for supporting a mechanism on a supporting structure, or more specifically in the disclosed exemplary structure, an air ring 10, FIG. 3, supported on the bottom of a regenerator vessel 21, in a fluid catalytic cracking unit (FCCU). Secondary support 13a comprises upper slip ring link 24 which is securely welded with weld 24a to the inner surface of upper slip ring 23a and pivotally connected with pivot pin 25a to line 24. Washers are then welded to each end of the pivot pin 25a to hold it in position. A shroud 26, FIG. 3, is welded by weld 26a to the slip ring 23a, FIG. 3, to extend inwardly over the secondary support 13a toward the center thereof for protecting the upper pivot pin 25a from erosion due to the turbulent hot gases.

Then, a second and lower slip ring 27 similarly is pivoted to lower link 40 on the lower end of the beam 22 of secondary support 13a with pivot pin 28, link 40 being welded to slip ring 27. After installation of the support 13a, washers are welded to each end of the pivot pin 28 to hold it in position.

An upper enlarged sleeve 29 is secured, as by welding, to a pad 30a consisting of the same material as the air ring 10, such as stainless steel in this case, which sleeve is also welded on the air ring 10 at the desired point of support. Directly below, a similar lower enlarged sleeve 31 is secured to carbon steel pad 32 which is likewise secured in a suitable manner, as by welding, to the internal bottom surface of the regenerator vessel structure 21. Insulating refractory 42 is installed in the vacant space inside the lower enlarged sleeve 31 and lower slip ring 27. A vent hole 35 is formed in the upper pad 30 and vent holes 36 and 37 are formed in lower pad 32 for escape of air between the pads and their contiguous structure to which the pads are welded.

With the two slip rings, 23a and 27, FIG. 3, of cold elongated support 13a inserted into their respective sleeves 29 and 31, the support is rotated until the upper pivot pin axis 39a, FIG. 1, is normal to the line of travel 17 extending from the pivot pin axis to the middle of the primary support inlet header 12. Then with the support so aligned, the elongated support 13a is secured in position, preferably by welding the lower slip ring 27 to the lower sleeve 31 with field weld 33 and then welding the upper slip ring 23a to the upper sleeve 29 with field weld 34.

Each of the other secondary supports 13b to 13d, FIG. 1, has its upper slip ring 23b to 23d, respectively, pivotal about its respective pivot pin axis 39b to 39d and its lower slip ring as 27, FIG. 3, pivotal about its respective pivot pin axis 41a, axes 41b–41d not shown but similar to axes 39b–39d. This broken line cold position of the supports, FIG. 2, is calculated to be such that after expansion of the primary and secondary supports upon reaching the operating temperatures between 1,100° F. and 1,400° F., the supports, as the illustrated secondary elongated support 13a of FIG. 2, will have pivoted to assume the solid line hot position illustrated in FIG. 2, for example, and the supported air ring 10, FIGS. 1 and 3, is essentially level.

Obviously other methods may be utilized for assembling the support structure of FIGS. 2–3 than those listed above, depending on the particular heat range in which it is expected to operate.

Accordingly, it will be seen that the above disclosed methods and support assembly will operate in a manner which meets each of the objects set forth hereinbefore.

While only one basic method of the invention and one basic mechanism formed by the disclosed method or by a similar method have been disclosed, it will be evident that various other methods and modifications are possible in the arrangement and construction of the disclosed methods and assemblies without departing from the scope of the invention and it is accordingly desired to comprehend within the purview of this invention such modifications as may be considered to fall within the scope of the appended claims.

We claim:

1. A method for forming a support assembly for supporting a mechanism on a supporting structure that may operate in the high temperature environment of at least 1,100°–1,400° F. wherein the support assembly comprises a primary support and a plurality of upright elongated secondary supports, each secondary support having first and second slip rings and pivot pins comprising the steps of,
    (a) fixedly securing a primary support between the mechanism at a predetermined first location point and the supporting structure,
    (b) pivotally mounting a first slip ring on a first pivot pin in one end of a first one of the plurality of elongated supports and pivotally mounting a second slip ring on a second pivot pin in the other end of the one elongated support,
    (c) extending an outer portion of the first slip ring into a first sleeve fixedly secured to the supported mechanism,
    (d) extending an outer portion of the second slip ring into a second sleeve fixedly secured to the supporting structure,
    (e) aligning the first pivot pin so that its longitudinal axis is normal to a line between the center of the first slip ring and the predetermined first location point,
    (f) fixedly securing the second slip ring to its supporting structure second sleeve with the first slip ring so aligned, and then,
    (g) fixedly securing the first slip ring to its supported mechanism first sleeve so that with any thermal expansion or contraction of the elongated supports, the supported mechanism, and the supporting structure due to operating in the high temperature environment causes pivotal movement of the first slip ring about its pivot pin and pivotal movement of the second slip ring about its pivot pin for preventing undue, intolerable, and unacceptable stresses in the fixed connections of the two slip rings, the two sleeves, and in portions of the supported mechanism and supporting structure adjacent the fixed connections, and whereby a simple and economical support assembly is formed because orientation and installation of the slip rings are easily and conveniently facilitated.

2. A method as recited in claim 1 including the method step of,
    (h) fixedly securing a shroud to the first slip ring to extend toward the other end of the one elongated support to thus protect the first pivot joint from erosion due to the high temperatures of the supported mechanism.

3. A method as recited in claim 1 including the steps of,
    pivotally mounting first and second slip rings on both respective ends of all of the upright elongated secondary supports, and
    attaching each of the rest of the plurality of elongated supports between the supporting structure and the mechanism by the same method steps as used with the first elongated secondary support.

4. A method as recited in claim 1 wherein the mechanism is an air ring supported in a regenerator vessel structure of a fluid catalytic cracking unit, wherein said primary support comprises an air inlet header and wherein step (a) comprises,
    welding the air ring at the first location point on the air ring to said air inlet header extending up from the bottom of the regenerator vessel structure, thereby forming the primary support.

5. A method as recited in claim 1 wherein the mechanism is an air ring supported in a regenerator vessel structure of a fluid catalytic cracking unit, wherein method step (b) comprises,
    welding the shroud to the first slip ring of the one elongated support to extend downward toward the second slip ring on the lower end of the one elongated support.

6. A method as recited in claim 1 wherein the mechanism is an air ring supported in a regenerator vessel structure of a fluid catalytic cracking unit, wherein method step (c) comprises extending an upper portion of the first slip ring into the first sleeve welded to the bottom of the air ring.

7. A method as recited in claim 1 wherein the mechanism is an air ring supported in a regenerator vessel structure of a fluid catalytic cracking unit, wherein method step (d) comprises, sliding the outer portion of the second slip ring on the lower end of the elongated support into the second sleeve fixedly secured to the regenerator vessel structure.

8. A method as recited in claim 1 wherein the mechanism is an air ring supported in a regenerator vessel structure of a fluid catalytic cracking unit, wherein method step (e) comprises, aligning the first slip ring pivot pin longitudinal axis on the top of the elongated support normal to the line between the center of the first slip ring and the first location point on the air ring.

9. A method as recited in claim 1 wherein the mechanism is an air ring supported in a regenerator vessel structure of a fluid catalytic cracking unit, wherein method step (f) comprises, welding the lower second slip ring to its regenerator vessel structure second sleeve as the first slip ring is held in alignment.

10. A method as recited in claim 1 wherein the mechanism is an air ring supported in a regenerator vessel structure of a fluid catalytic cracking unit, wherein method step (g) comprises, welding the first slip ring on the top of the elongated support to its air ring first sleeve as the elongated support is held in position by the previous fixedly securing step (f) whereby any thermal expansion or contraction of the elongated supports, the air ring, and the regenerator vessel structure due to operating in the high temperature environment causes pivotal movement of the first slip ring about its pivot pin for preventing undue, intolerable, and unacceptable stresses in the fixed connections of the elongated supports.

11. A method for forming a support assembly for supporting an air ring in a regenerator in a fluid catalytic cracking unit operating in the temperature range of at least 1,100°–1,400° F. comprising the steps of,
  (a) welding an air inlet header between the air ring at a predetermined location point and the bottom of the regenerator,
  (b) connecting other elongated supports under the air ring, said step of connecting said elongated supports comprising,
  (c) pivotally mounting slip rings on pivot pins on opposite ends of each of the other supports, the two pins on each support being formed parallel to each other,
  (d) inserting the pivotally mounted pair of slip rings of each support into the two corresponding sleeves mounted oppositely on the air ring and regenerator,
  (e) aligning each support so that its corresponding pivot pin longitudinal axis is normal to a line between the center of the slip ring and the predetermined location point, and
  (f) welding the slip rings in their respective sleeves with the supports so aligned to provide pivotal movement about the slip ring pins for elimination of any bending stresses due to thermal expansion or contraction.

12. A support assembly for supporting a mechanism on a supporting structure for operating in a high temperature environment of at least 1,100°–1,400° F. comprising,
  (a) first connecting means for fixedly attaching a primary support between the mechanism at a predetermined first location point and the supporting structure,
  (b) a plurality of other elongated support means also for supporting the mechanism on the support structure,
  (c) first and second slip ring means pivotally mounted on parallel first and second pivot pins, respectively, on opposite ends of at least one of said other elongated support means,
  (d) said first slip ring means including its first pivot pin being positioned in a first sleeve fixed to said mechanism with said first pivot pin being positioned so that its longitudinal axis is normal to a line between the center of said first slip ring means and said predetermined location point,
  (e) said second slip ring means including the second pivot pin being fixedly secured internally of a second sleeve fixedly mounted on said supporting structure with said first pivot pin normal to said line, and
  (f) said first slip ring means being fixedly secured to said first sleeve for providing a simple and efficient support assembly whereby with any thermal expansion or contraction of the elongated support means, the supported mechanism, and the supporting structure due to operating in the high temperature environment causes pivotal movement at the first slip ring means about its first pivot pin and pivotal movement of the second slip ring means about its second pivot pin for preventing undue, intolerable, and unacceptable stresses in the fixed connections of both slip ring means and sleeves, and in portions of the supported mechanism and supporting structure adjacent the fixed connections.

13. A support assembly as recited in claim 12 wherein,
  first and second slip rings are pivotally mounted on both respective ends of all of said plurality of other elongated support means.

14. A support assembly as recited in claim 12 wherein,
  said one elongated support means is an elongated structural beam, and
  said first and second slip ring means are first and second slip rings pivotally mounted on said parallel first and second pins, respectively, on the opposite ends of said elongated structural beam.

15. A support assembly as recited in claim 12 wherein,
  (g) a shroud is welded to said first slip ring means and extends toward said opposite end of said other elongated support means.

16. A support assembly as recited in claim 12 wherein,
  said mechanism supported on a supporting structure is an air ring means supported in a regenerator vessel structure of a fluid catalytic cracking unit, and
  said first connecting means is a weld joint connecting said air ring to an air inlet header as the primary support element extending up from the bottom of the regenerator vessel structure.

17. A support assembly as recited in claim 16 wherein,
said first slip ring means is welded to said first sleeve, and
said first sleeve is welded to the bottom of said air ring means.

18. A support assembly is recited in claim 17 wherein,
said second slip ring means is welded to said second sleeve, and
said second sleeve is welded to the bottom of said regenerator vessel structure of the fluid catalytic cracking unit.

19. A support assembly for supporting an air ring in a regenerator vessel structure of a fluid catalytc cracking unit for operating in a high temperature environment of at least 1,100°–1,400° F. comprising,
   (a) first connecting means fixedly connecting an air inlet header mounted in the regenerator vessel structure to an air ring at a predetermined first location point,
   (b) a plurality of other elongated supports adapted to be connected between the air ring and the regenerator vessel structure along with the air inlet header for supporting the air ring,
   (c) a first slip ring pivotally mounted on a first pivot pin on one end of at least one of said elongated supports,
   (d) a second slip ring pivotally mounted on a second pivot pin on the other end of said one elongated support, said two pivot pins being parallel to each other,
   (e) said first slip ring including its first pivot pin being positioned in a first sleeve fixed to the air ring with said first pivot pin being positioned so that its longitudinal axis is normal to a line between the center of said first slip ring and said predetermined location point,
   (f) said second slip ring being welded to a second sleeve fixed to the regenerator vessel structure with said first pivot pin normal to said line, and
   (g) said first slip ring being welded to said first sleeve for providing a simple and efficient support assembly so that with any thermal expansion or contraction of the elongated supports, the supported air ring, and the supporting regenerator vessel structure due to operating in the high temperature environment causes pivotal movement of the first slip ring about its first pivotal pin and pivotal movement of the second slip ring about its second pivot pin for preventing undue, intolerable, and unacceptable stresses in the welded connections of the slip rings, the sleeves, and portions of the supported air ring and supporting regenerated vessel structure adjacent the welded connections.

20. A support assembly as recited in claim 19 wherein,
first and second slip rings are pivotally mounted on both respective ends of all of said plurality of other elongated supports for elimination of any bending stresses due to thermal expansion or contraction.

* * * * *